UNITED STATES PATENT OFFICE.

SAMUEL P. ETTER, OF BIRMINGHAM, ALABAMA.

PROCESS OF DEPHOSPHORIZING IRON.

SPECIFICATION forming part of Letters Patent No. 614,852, dated November 29, 1898.

Application filed November 15, 1897. Serial No. 658,629. (No specimens.)

*To all whom it may concern:*

Be it known that I, SAMUEL P. ETTER, residing at Birmingham, in the county of Jefferson and State of Alabama, have invented certain new and useful Improvements in the Process of Dephosphorizing Iron; and I do hereby declare the following to be a full, clear, and exact description of the invention, such as will enable others skilled in the art to which it appertains to make and use the same.

My invention is a process designed for the treatment of crude iron ore high in either silicon or phosphorus, or both, by which I am enabled to produce a malleable iron and steel very low in both phosphorus and silicon and of a greatly superior strength and ductility.

The crushed ore and coke are placed in the blast-furnace in the well-known manner.
There is little or no difference in the herein-described process whether or not the blast-furnace is basic-lined. I then take a sufficient quantity of pulverized or powdered dihydrate of aluminium and iron or bauxite and add them to the coke and iron ores in the furnace in such quantities as the analysis of the iron ore may dictate and the process of reduction may require. As the smelting progresses additional quantities of pulverized or powdered dihydrate of aluminium and iron are thrown into the furnace, into and upon the upper part of the charge, and thoroughly mixed with the molten iron. This addition of the dihydrate of aluminium and iron from time to time is continued until the tests of the iron show that the silicon or the phosphorus, or both silicon and phosphorus, have been practically nearly or quite removed, and the iron thereby treated being what is
known as "iron low in phosphorus" and of a very superior quality.

I am aware that bauxite has been used as a material from which agents have been produced for refining molten iron and steel; but I am not aware that powdered bauxite or the dihydrate of aluminium and iron has ever been used as a direct agent for dephosphorizing the crude ores. I therefore do not claim, broadly, the use of bauxite for dephosphorizing iron; but

What I do claim is—

The herein-described process of dephosphorizing iron ore, consisting, first, in mixing the coke and crushed ore and a suitable quantity of finely-powdered dihydrate of aluminium and iron, placing in a blast-furnace and subjecting to smelting operation; second, adding to the upper part of the charge from time to time during said smelting operation, in any suitable manner, quantities of powdered dihydrate of aluminium and iron, whereby an anhydrous compound in a nascent state will be produced within the furnace in the presence of the vapor of phosphorus, thereby producing an active agent that will readily and quickly combine with the said vapor of phosphorus in said furnace and removing it from the iron, the operation being carried on under such conditions that the dephosphorization of the ore by the alumina dihydrate is effected before reduction of the iron therefrom as and for the purpose set forth.

In testimony whereof I affix my signature in presence of two witnesses.

SAMUEL P. ETTER.

Witnesses:
HENRY R. HOWZE,
A. C. HOWZE.